US 7,002,661 B2

(12) United States Patent
Scarabelli et al.

(10) Patent No.: US 7,002,661 B2
(45) Date of Patent: Feb. 21, 2006

(54) METHOD OF MANUFACTURING LIQUID CRYSTAL DISPLAYS HAVING AN INTERNAL POLARIZER

(75) Inventors: Christian Scarabelli, Saint Christophe (IT); Corrado Gerbaz, Aosta (IT)

(73) Assignee: TECDIS S.p.A., Chatillon (IT)

( * ) Notice: Subject to any disclaimer, the term of this patent is extended or adjusted under 35 U.S.C. 154(b) by 103 days.

(21) Appl. No.: 10/483,215

(22) PCT Filed: Jul. 12, 2001

(86) PCT No.: PCT/IT01/00367

§ 371 (c)(1),
(2), (4) Date: Apr. 1, 2004

(87) PCT Pub. No.: WO03/007063

PCT Pub. Date: Jan. 23, 2003

(65) Prior Publication Data

US 2004/0151830 A1  Aug. 5, 2004

(51) Int. Cl.
*B05D 5/06* (2006.01)
(52) U.S. Cl. .................. 349/187; 349/96; 428/1.26; 427/162; 427/164
(58) Field of Classification Search ............... 428/1.26
See application file for complete search history.

(56) References Cited

U.S. PATENT DOCUMENTS

2002/0163616 A1 * 11/2002 Jones et al. ............... 349/187

FOREIGN PATENT DOCUMENTS

| EP | 0 961 138 | 12/1999 |
|----|-----------|---------|
| WO | 94 28073 | 12/1994 |
| WO | 97 39380 | 10/1997 |

OTHER PUBLICATIONS

Y. Bobrov et al. "Thin Film LCD: Design and Manufacturing" 8th Intl Workshop on AM-LCD, Tokyo Japan Jul. 11-13, 2001 XP002193610.
Y. Bobrov et al. "Incorporation of Optiva Polarizers in LCD Production Line" Society of Information Displays Digest, vol. XXXII, Jun. 2001 pp. 639-641.

* cited by examiner

*Primary Examiner*—Dung T. Nguyen
*Assistant Examiner*—(Nancy) Thanh-Nhan P. Nguyen
(74) *Attorney, Agent, or Firm*—Merchant & Gould, P.C.

(57) ABSTRACT

Polarizing coatings are formed from dyestuffs which provide a stable liquid crystalline phase in a wide range of concentrations, temperatures and pH-values. Particles formed by aggregates of the liquid crystal molecules are oriented in a predetermined direction to polarize light The stability of the liquid crystalline state allows orienting the particles by mechanical forces such as a shearing force applied when the liquid crystal (10) is spread on a support surface (20) by a knife-like doctor (90) or a tension deformation force acting on the meniscus of the liquid crystal deposited between two surfaces (20, 30) as the surfaces are peeled off one another. As a result, the polarizing coatings are formed in some embodiments by simple methods. In some embodiments, the polarizing coatings have a high lightfastness, a high thermal stability, and a high dichroic ratio.

10 Claims, 2 Drawing Sheets

METHOD OF MANUFACTURING LIQUID CRYSTAL DISPLAYS HAVING AN INTERNAL POLARIZER

Figure 1:
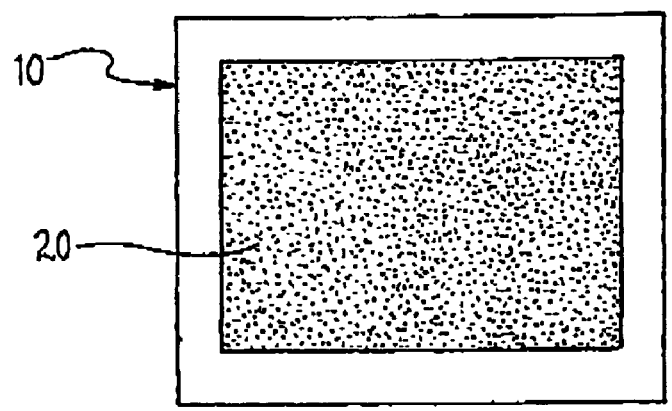

The present invention relates to a method for manufacture of liquid crystal displays according to the preamble of claim 1, and more specifically a method for the manufacture of liquid crystal displays in which the polarising layers are formed internally of the cell and obtained by deposition of a liquid crystal substance.

A liquid crystal display (more commonly known by the acronym LCD) is formed by two plates of glass facing one another and separated by a gap within which is contained a liquid crystal substance.

On the inner surfaces of the glass plates a transparent conductive layer constituting the electrodes is deposited, typically $In_2O_3$ and/or $SnO_2$, configured in such a way as to form the symbols which it is intended to display (alphanumeric characters, graphic points, icons) The resultant structure is covered with a so-called alignment layer.

The alignment layer, generally of polyimide resin, is in contact with the liquid crystal substance and contributes to promote an univocal orientation of its molecules over the entire contact surface.

A polarising layer is commonly disposed on the outer surfaces of the glass plates and is orientated in such a way that the directions of polarisation of the two layers are orthogonal to one another (in the case of liquid crystals of the twisted nematic type) or at some other angle (for applications of the super-twisted nematic type).

As is known in the art, back-lit or reflection displays can be made and, depending on the arrangement adopted, a further reflecting layer or a convenient illumination device is provided on the rear plate of the device respectively.

The manufacturing process of a liquid crystal display comprises a first series of overall operations performed on a pair of glass sheets on which a plurality of devices (of the order of a hundred for each pair of sheets with current technology) is defined and a second series of operations performed after bringing the original sheets together in a facing position and cutting or separating the cells constituting the individual devices.

The first series of operations comprise, in succession, the steps of washing and sterilisation of the glass sheets, formation of the electrode and electrical connection portions through conventional techniques of deposition, photolithography and etching, printing of the alignment layer and the subsequent treatment (abrasion) of its surface in contact with the liquid crystal.

To allow the glass sheets to be joined together in such a way as to form the gap into which the liquid crystal is introduced, while nevertheless guaranteeing the electrical connection between the plates which together form each display, spacer elements formed by an adhesive substance in which are embedded micro spheres of conductive material are conveniently deposited by silk screen printing on one of the sheets. Then the glass sheets are joined together and the subsequent operations of cutting for separation of the cells constituting the individual devices is performed.

Once separation of the cells has taken place, each of these is filled with the liquid crystal substance and subsequently sealed, then the polarising layers are applied to the outer faces of the device in contact with the glass plates.

At the end of the series of operations described above, and before the final packaging, a covering and sealing operation is again performed to ensure a protective anti-corrosion cladding.

Conventionally, the polarising layers consist of an adhesive film of cellulose triacetate and are applied by simple gluing on both the outer faces of the plates, increasing the overall thickness of the device by about 2×200 microns (a value including the thickness of a polarising film and the adhesive layer).

Recently a liquid crystal substance such as, for example, the product LCP (Liquid Crystal Polariser) commercially available by Optiva Inc. of San Francisco, Calif., United States, under the name TCF (Thil Crystal Film), has been used to form polarising layers. Sub a polarising substance is described in International Patent Application WO 94/28073 in the name Russian Technology Group. It is a liotropic, water soluble, liquid crystal composition which has structural characteristics similar to those of the discotic lied crystal substances having molecular agglomerates of thin and elongate form. By depositing a quantity of substance in liquid form on the surface on which it is desired to form the, polarising layer, and subjecting it to stretching or other directional mechanical action, its molecular structure is induced to orientate itself parallel to the axis of working so that the molecular agglomerates dispose themselves in alignment with one another assuming an overall configuration similar to that of a common polarising film. Once stretched the substance crystallises in a thin film following evaporation of the water contained in it.

It has been determined experimentally that the polarising layers thus formed have better operative characteristics of contrast, angle of view and reliability. The thickness of the layer (of the order of 0.5–1.0 micron) is significantly, reduced and makes it possible to obtain an improved overall transmittance of the device.

A first technique for manufacturing a device with liquid crystal polariser involves application of the polarising layer to the outer faces of the plate of the device and its protection by means of a fixing lacquer (acrylate).

A second manufacturing technique involves, on the other hand, the application of the polarising layer to the inner faces of the plates an does not therefore require any additional protective layer, rather only a phase of "stabilisation" to render the substance insoluble in water.

For the purpose of permitting an efficient production on an industrial scale, the improvements to the production cycle are directed at making possible the application of the polarising layer directly onto the original glass sheets, in a single general operation, before printing of the alignment layer and separation of the cells.

One disadvantage arises in the cutting operation for separation of the constituent cells of the individual devices since the presence of the polarising layer in the cut sections causes local tensions in the polariser structure sing an imperfect cut, for example with the formation of cracking or superficial fractures.

A further disadvantage is given by the difficult and unstable application on the polariser of the gluing epoxy substance which is needed for joining the glass sheets together before separation of the cells.

These disadvantages are currently resolved by exploiting the property of the substance used of being soluble in water. The polarising layer, after its uniform deposition, is therefore selectively removed by delivering micro-drops of water in the regions of separation between the display areas of the devices to be formed and subsequently sucking away the dissolved polarizing substance.

The conventional process involves selective removal by scanning the entire glass sheet with a probe including the delivery and sucking members, mounted on a cartesian-coordinate robot machine. The speed of advance is very slow (it travels at about 20–25 mm per second) and long working times are therefore required for sheets carrying a hundred devices (such sheets typically have dimensions of 400×400 mm). For mass production different machines would be necessary, increasing the costs of the manufacturing process.

Another disadvantage is due to the fact that a variation in the configuration of the product (for example in the definition of the display areas of the devices on the sheets) involves a replacement of the probes and the elapse of a subsequent setting up time for memorisation in the machine of new displacement steps along the axes.

Moreover, it is always necessary manually to remove excesses of material in the perimetral region of the sheet where the cartesian-coordinate robot machine cannot operate with precision.

In any case, removal of the polarising substance takes place by acting on the layer before stabilisation, that is to say while it still has characteristics of water solubility, with evident risks of damage thereof in the parts which it would be desirable to preserve.

The present invention sets out to provide a method for the manufacture of liquid crystal displays in such a way as to overcome the previously explained problems.

In particular, the object of the invention is to provide a method of manufacture for mass production able to allow the application of a layer, of liquid crystal polariser and its rapid, precise and efficient selective removal from the separation regions between the display areas of the devices.

According to the present invention this object is achieved by a method of manufacturing liquid crystal displays having the characteristics set out in claim 1.

The method of the invention is characterised by the fact that it exploits the conventional application of the alignment layer of polyimide resin, which takes place in dependence on the specific configuration of the areas to be covered, as a protective mask ("resist") over the polarising layer. The polarising layer is then selectively removed in the exposed regions, not masked by the alignment layer. This operation is consistent with working in a clean room in the production area in a which the product being produced is located and makes it possible to exploit the apparatus normally in use in such area (immersion vessels, washing stations, drying ovens). The same printing operation of the alignment layer is not additional, but rather normally required by the process, and therefore the productive flow is not further weighed down or slowed and new machines are not required.

In the method according to the invention the polarising layer is stabilised (that is to say rendered water insoluble) immediately after its application, and its removal takes place by immersion in a basic solution and not simply by washing. Advantageously, this solution makes it possible to obtain clear-cut separation regions between the areas of the devices, which are free from solid residues of polarising substance, thus avoiding the formation of spurious particles within the interior of the finished product.

The selective removal of the layer of exposed polarising material by immersion of the sheet in an "etching" bath also allows removal of the print residues present on the sheet.

The entire process is conducted in the production line and makes it possible to keep down the time taken to pass through the production line, being demonstrably rather functional for mass production.

Further characteristics and advantages of the invention will be explained in more detail in the following detailed description of an embodiment given purely by way of non-limitative example, with reference to the attached drawings in which FIG. from 1 to 6 schematically represent the succession of steps of the application and selective removal of the polarising layer on a sheet on which a plurality of displays is defined.

In the drawings there is shown an original glass sheet 10 from which are formed the plates intended for the production of a plurality of liquid crystal displays.

Definition of the areas of the plates and the display areas of the individual devices, as well as the formation of electrodes and conductive paths are operations widely known in the art and will not be described here, also because they are per se not relevant for the purposes and understanding of the invention.

After formation of the electrodes, a layer 20 of polarising material in liquid form is applied over the entire sheet 10, defining the orientation of the molecules thereof along a pre-determined direction to determine the axis of polarisation (transmission axis of the light).

The polarising layer 20 is shown in FIG. 1. Its application preferably takes place by spreading (or similar mechanical stretching action), along the predetermined polarisation direction, of a quantity of substance previously delivered in rough form. The spreading is performed by the use of a sort of doctor blade or similar distribution tool, the blade of which, having a sufficient length to extend across the entire sheet 10 in its sliding motion with respect thereto, has a corrugated contact profile. In the preferred embodiment the spreading tool is constituted by a cylindrical bar on which is wound a spiral of steel wire, and has a contact profile with the substance to be spread having the general form of a succession of contiguous arches the convexity of which faces the sheet.

Deposition of the layer with the most precise deposition techniques makes it possible to obtain a thickness of the crystallised polariser of the order of 0.5–1 micron.

Figure 2:
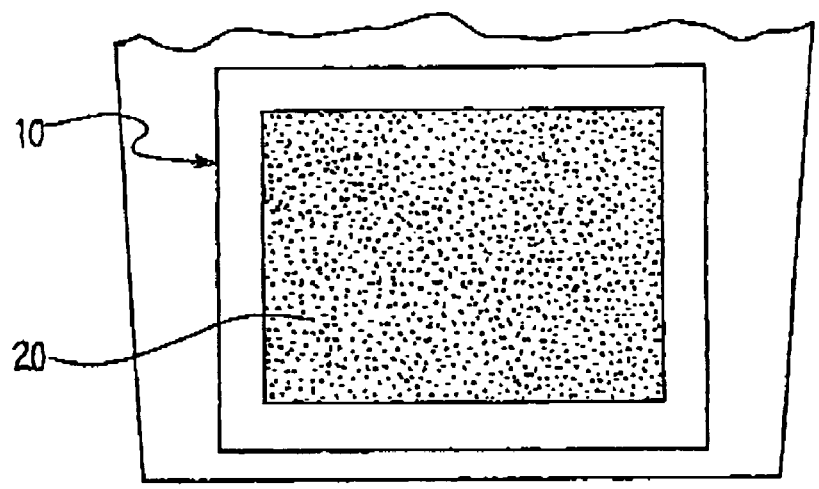
Figure 3:
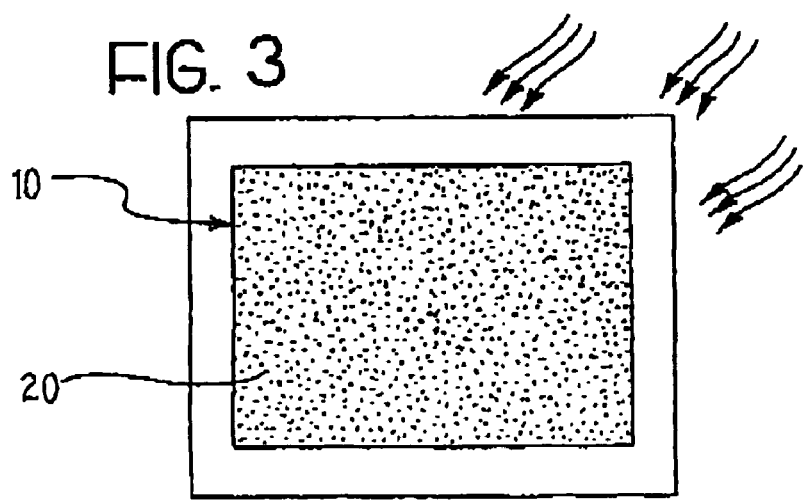

Subsequently, to render the constituted polariser layer water insoluble the sheet 10 is immersed (see FIG. 2) in an aqueous solution of $BaCl_2$, and then washed in de-ionised water. Preferably the solution is a solution of $BaCl_2$ at 10% in de-ionised $H_2O$. The is immersion phase is followed by a drying phase in a static oven at 90° C. for about 20 minutes (FIG. 3) to eliminate any residual moisture.

Figure 4:
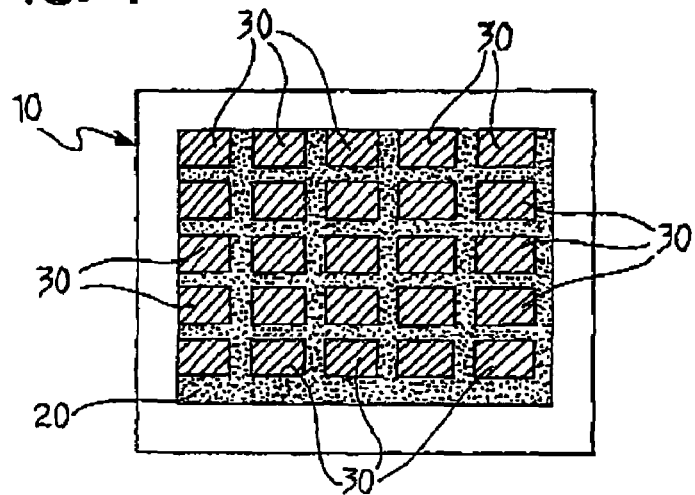

At the end of the stabilisation operations of the polarising layer 20 an alignment layer of polyimide resin is applied to it by printing by means of a mark defining a matrix of display areas 30 of the devices (FIG. 4). The alignment layer with its configuration has the additional function of protective masking or "resist" for the polarising layer.

Thanks to the masking, the areas of the sheet 10 corresponding to the display areas 30 of each device where the polariser must be maintained are covered with extreme precision, leaving exposed the separation regions between contiguous display areas.

Figure 5:
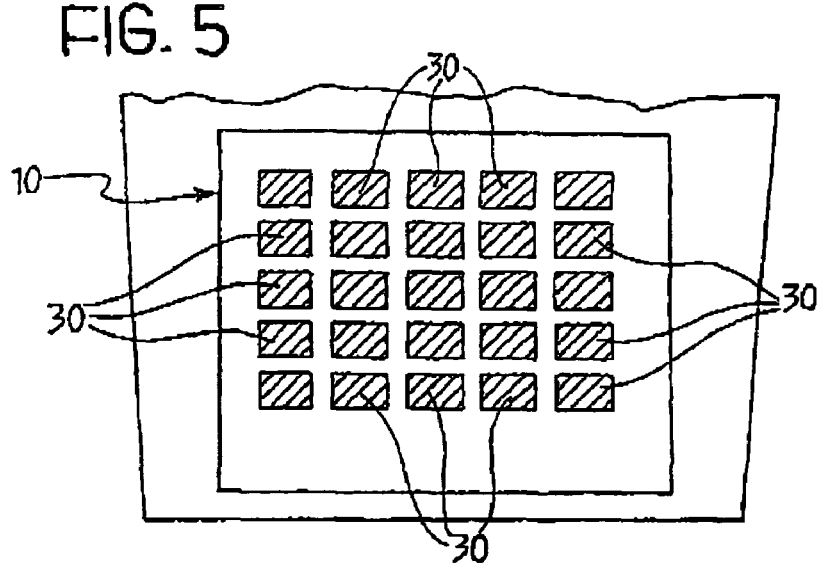

The polarising layer 20 is selectively removed in the exposed regions not masked by the alignment layer by immersion of the sheet 10 in an aqueous solution of NaOH (FIG. 5) and washing in de-ionised water in two successive rousing baths. Preferably the solution is a solution of BaOH at 0.1% in de-ionised $H_2O$, and the immersion lasts for about 20 seconds.

Figure 6:
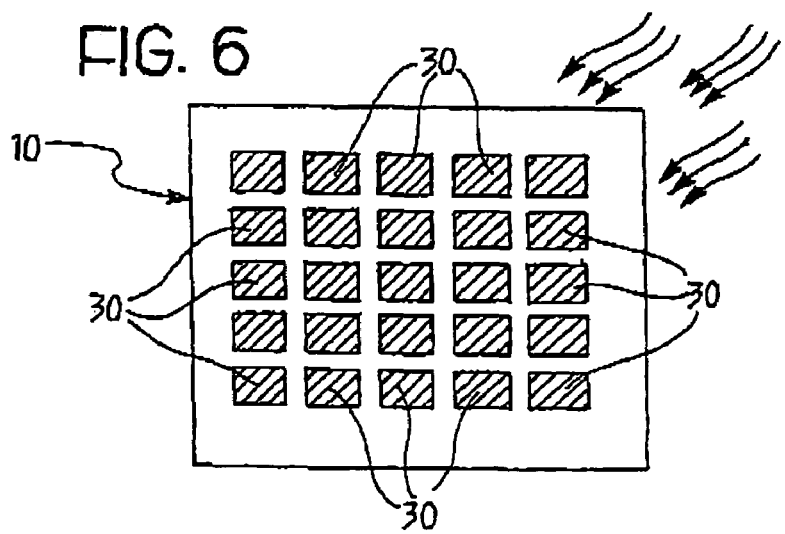

The immersion phase is followed by a drying phase in a static oven at 90° C. for about 20 minutes (FIG. 6) to eliminate any residual moisture.

All the operations described above are performed along the production line in clean rooms avoiding any contamination of the sheets in the polarising layers application phase.

At the end of these operations the conventional operation of treatment by abrasion of the alignment layer, joining of the sheets in facing position and cutting to separate the cells constituting the individual devices as already described in the introductory part of this description, are performed. Then, on each cell, are repeated the operations of introduction of the liquid crystal, assembly of the respective control circuits, and final packaging of the product, according to known criteria.

Naturally, the principle of the invention remaining the same, the embodiments and details of construction can be widely varied from what has been described and illustrated purely by way of non-limitative example, without by this departing from the scope of protection of the present invention as defined in the attached claims.

What is claimed is:

1. A method for the manufacture of liquid crystal displays, each comprising
   a pair of facing plates coupled in such a way as to form a cell able to receive the liquid crystal; and
   a respective pair of polarizing layers associated with the plates,
   in which a plurality of plates is formed starting from an original sheet (10),
   the method being characterised in that it comprises the operation of
   application of a polarising layer (20) by deposition of a liquid crystal polarising substance and orientation of the molecules of the substance for determination of the polarisation axis;
   application of an alignment layer of polyimide resin onto the crystallised polariser layer (20) according to a predetermined configuration substantially corresponding to the display areas (30) of the devices; and
   subsequent selective removal of exposed portions of the polarising layer (20) from the separation regions between the display areas (30) of the devices, not masked by the alignment layer,
   the said operations being performed before the operations of coupling a pair of sheets (10) in facing position and subsequent separation of the individual cells.

2. A method according to claim 1, in which the selective removal of exposed portions of the polarising layer (20) takes place by immersion of the sheet (10) in an aqueous solution of NaOH and at least one subsequent washing.

3. A method according to claim 2, in which the said aqueous solution of NaOH is 0.1% solution of NaOH in de-ionised $H_2O$.

4. A method according to claim 2, in which the immersion phase lasts about 20 seconds.

5. A method according to claim 2, in which the immersion and washing phases are followed by a drying phase at 90° C. for about 20 minutes.

6. A method according to claim 1, characterised in that the polarising liquid crystal substance is water soluble, and in that the operation for application of the alignment layer is preceded by a stabilisation operation of the crystallised substance constituting the polarising layer (20) to render the said substance non water insoluble, the said stabilisation operation comprising a phase of immersion of the sheet (10) in an aqueous solution of $BaCl_2$ and subsequent washing.

7. A method according to claim 6, in which the said aqueous solution of $BaCl_2$ is a 10%; solution of $BaCl_2$ in de-ionised $H_2O$.

8. A method according to claim 6, in which the said stabilisation operation further comprises a drying phase at 90° C. for about 20 minutes after the immersion and washing phases.

9. A method according to claim 1, characterised in that the operation for application of the alignment layer is performed by printing by means of a mask, for definition of the display areas (30) of the devices.

10. A method according to claim 1, characterised in that operations of deposition and orientation of the molecules of the polarising liquid crystal substance constituting the polarising layer (20) are effected together by spreading along the polarisation direction a quantity of substance previously delivered in rough form, the spreading being achieved by means of a tool in the form of a bar having a corrugated profile in longitudinal section, orthogonal to the direction of spreading.

* * * * *